United States Patent
Choi

(10) Patent No.: US 12,341,852 B2
(45) Date of Patent: Jun. 24, 2025

(54) FRAMEWORK, METHOD, AND DEVICE FOR INTERNET OF THINGS SERVICE

(71) Applicant: ELECTRONICS AND TELECOMMUNICATIONS RESEARCH INSTITUTE, Daejeon (KR)

(72) Inventor: Younghwan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/342,611

(22) Filed: Jun. 27, 2023

(65) Prior Publication Data

US 2024/0007534 A1 Jan. 4, 2024

(30) Foreign Application Priority Data

Jun. 16, 2023 (KR) ........................ 10-2023-0077154

(51) Int. Cl.
*H04L 67/125* (2022.01)
*G16Y 40/30* (2020.01)
*H04L 67/1097* (2022.01)

(52) U.S. Cl.
CPC ............ *H04L 67/125* (2013.01); *G16Y 40/30* (2020.01); *H04L 67/1097* (2013.01)

(58) Field of Classification Search
CPC .... H04L 67/125; H04L 67/1097; G16Y 40/30
See application file for complete search history.

(56) References Cited

U.S. PATENT DOCUMENTS

| 9,602,602 | B2 | 3/2017 | Choi et al. | |
|---|---|---|---|---|
| 10,104,038 | B2 | 10/2018 | Choi et al. | |
| 11,341,463 | B2 * | 5/2022 | DeLuca | H04L 67/10 |
| 11,507,698 | B2 * | 11/2022 | Sohail | H04W 12/122 |
| 11,893,150 | B2 * | 2/2024 | Alexander | G06Q 20/36 |
| 2016/0173495 | A1 * | 6/2016 | Joo | H04L 63/1425 713/171 |
| 2021/0056141 | A1 | 2/2021 | Wojcik | |
| 2021/0144517 | A1 | 5/2021 | Guim Bernat et al. | |
| 2022/0353297 | A1 * | 11/2022 | Sharma | H04L 63/0263 |

FOREIGN PATENT DOCUMENTS

| KR | 10-2019-0098365 A | 8/2019 |
|---|---|---|
| KR | 10-2020-0129625 A | 11/2020 |
| KR | 10-2021-0077135 A | 6/2021 |

OTHER PUBLICATIONS

Karen Rose et al., "The Internet of Things: An Overview", Internet Society, Oct. 2015.

* cited by examiner

*Primary Examiner* — Nazia Naoreen

(57) ABSTRACT

A framework for an Internet of things (IoT) service is provided. The framework includes a first device configured to obtain user-related data for the IoT service and control an IoT device based on control data that is generated using the user-related data and a second device configured to generate the control data by analyzing the user-related data. The first device and the second device are configured to share, using a blockchain, the user-related data and the control data.

14 Claims, 4 Drawing Sheets

FRAMEWORK, METHOD, AND DEVICE FOR INTERNET OF THINGS SERVICE

CROSS-REFERENCE TO RELATED APPLICATION

This application claims the benefit of Korean Patent Application Nos. 10-2022-0081007 filed on Jul. 1, 2022 and 10-2023-0077154 filed on Jun. 16, 2023, in the Korean Intellectual Property Office, the entire disclosures of which are incorporated herein by reference for all purposes.

BACKGROUND

1. Field of the Invention

One or more embodiments relate to a framework, method, and device for Internet of things (IoT) service.

2. Description of the Related Art

IoT refers to technology for connecting devices and objects through a network for data sharing and automation. Along with artificial intelligence (AI), the need for AI-based IoT technology is emerging.

The above description has been possessed or acquired by the inventor(s) in the course of conceiving the present disclosure and is not necessarily an art publicly known before the present application is filed.

SUMMARY

An embodiment may reduce network load by managing data in a distributed manner through a blockchain.

An embodiment may provide an adaptive service by predicting a pattern change of an Internet of things (IoT) service using a neural network.

However, the technical aspects are not limited to the aforementioned aspects, and other technical aspects may be present.

According to an aspect, there is provided a framework for IoT service, the framework including a first device configured to obtain user-related data for the IoT service and control an IoT device based on control data that is generated using the user-related data and a second device configured to generate the control data by analyzing the user-related data, wherein the first device and the second device are configured to share, using a blockchain, the user-related data and the control data.

The first device may include an IoT device management (IDM) server configured to receive the user-related data from the IoT device and control the IoT device and a first data storage (DS) server configured to store the user-related data and the control data and share the user-related data and the control data with the second device through the blockchain.

The second device may include a second DS server configured to share the user-related data and the control data with the first device through the blockchain, a convergence service management (CSM) server configured to receive the user-related data from the second DS server and manage the user-related data, and a data processing (DP) server configured to predict a pattern change of the IoT service using user-related data that is selected by the CSM server among the user-related data and generate the control data based on the pattern change of the IoT service.

The DP server may be configured to predict the pattern change of the IoT service using a neural network.

The neural network may be trained based on reinforcement learning.

According to an aspect, there is provided a method of providing an IoT service, the method including obtaining, by a first device, user-related data for the IoT service, controlling, by the first device, an IoT device based on control data that is generated using the user-related data, and generating, by a second device, the control data by analyzing the user-related data, wherein the first device and the second device are configured to share, using a blockchain, the user-related data and the control data.

The first device may include an IDM server configured to receive the user-related data from the IoT device and control the IoT device and a first DS server configured to store the user-related data and the control data and share the user-related data and the control data with the second device through the blockchain.

The second device may include a second DS server configured to share the user-related data and the control data with the first DS server through the blockchain, a CSM server configured to receive the user-related data from the second DS server and manage the user-related data, and a DP server configured to predict a pattern change of the IoT service using user-related data that is selected by the CSM server among the user-related data and generate the control data based on the pattern change of the IoT service.

The DP server may be configured to predict the pattern change of the IoT service using a neural network.

The neural network may be trained based on reinforcement learning.

According to an aspect, there is provided a device for an IoT service, the device including a memory including instructions and a processor electrically connected to the memory and configured to execute the instructions, wherein, when the instructions are executed by the processor, the processor is configured to control a plurality of operations. The plurality of operations may include obtaining user-related data for the IoT service using a blockchain, predicting a pattern change of the IoT service using the user-related data, generating control data based on the pattern change of the IoT service, and sharing, using the blockchain, the control data with an IoT device management device.

The predicting of the pattern change of the IoT service may include predicting the pattern change of the IoT service by inputting the user-related data to a neural network.

The neural network may be trained based on reinforcement learning.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
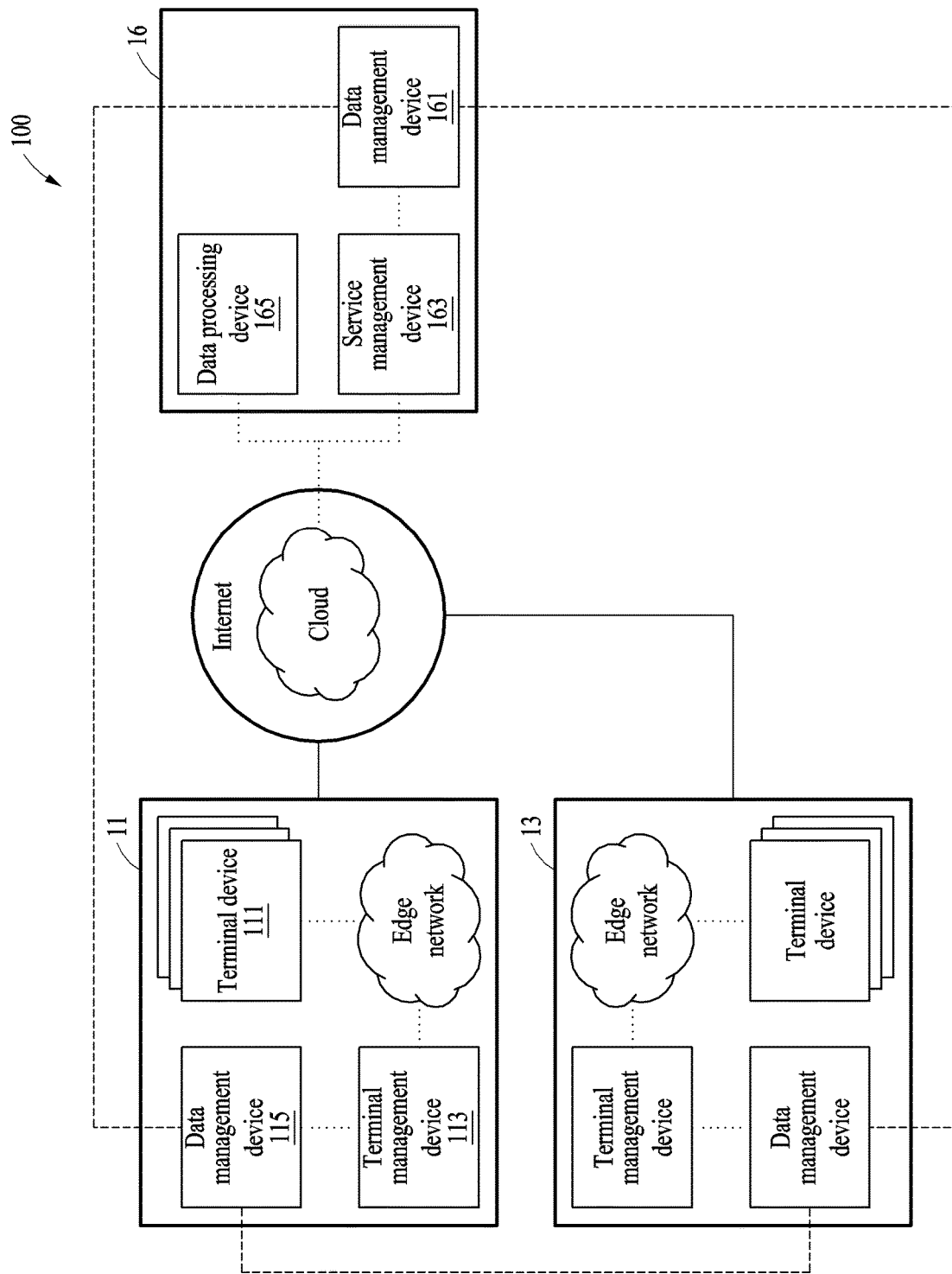
FIG. 1 is a diagram illustrating a framework for an IoT service, according to an embodiment.

The following structural or functional descriptions of embodiments described herein are merely intended for the purpose of describing the embodiments described herein and may be implemented in various forms. Thus, an actual form of implementation is not construed as limited to the embodiments described herein and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, and similarly, the second component may be referred to as the first component.

When it is mentioned that one component is "connected," "coupled," or "joined" to another component, it may be understood that the one component is directly connected, coupled, or joined to another component or that still other component may be interposed between the two components.

As used herein, the singular forms "a," "an," and "the" are intended to include the plural forms as well, unless the context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

The term "module" used in this document may include a unit implemented in hardware, software, or firmware, and may be used interchangeably with terms such as logic, logic block, component, or circuitry. A module may be an integrally constructed component or a minimal unit of the component or part thereof that performs at least one function. For example, according to an embodiment, the module may be implemented as an application-specific integrated circuit (ASIC).

The term "unit" used in this document may refer to software or a hardware component such as a field programmable gate array (FPGA) or an ASIC, and "unit" may perform predetermined roles. However, "unit" is not limited to software or hardware. "Unit" may be configured to be in an addressable storage and may be configured to operate at least one processor. For example, "unit" may include components such as software components, object-oriented software components, class components, and task components, processes, functions, properties, procedures, subroutines, segments of program code, drivers, firmware, microcode, circuitry, data, database, data structures, tables, arrays, and variables. A function provided within the components and "units" may be combined with a smaller number of components and "units" or further divided into additional components and "units." In addition, the components and "units" may also be implemented to operate at least one central processing unit (CPU) in a device or a secure multimedia card. In addition, "unit" may include at least one processor.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a diagram illustrating a framework for an IoT service, according to an embodiment.

Referring to FIG. 1, according to an embodiment, a framework 100 for an IoT service may include at least one edge network-based device group (e.g., an edge network-based device group 11, an edge network-based device group 13, etc.) and a cloud-based device group 16. Hereinafter, for convenience of description, the framework 100 for an IoT service including two edge network-based device groups 11 and 13 is described as an example.

The edge network-based device group 11 may include a terminal device 111 (e.g., an IoT device such as a sensor and actuator), a terminal management device 113, and a data management device 115.

The terminal device 111 may obtain user-related data (e.g., information) for an IoT service. The user-related data may include data related to the life pattern of the user (e.g., a temperature, humidity, and a movement route of the user). The terminal device 111 may obtain the user-related data in various ways. For example, the terminal device 111 may obtain the user-related data from a user's input or may obtain the user-related data using sensors. The terminal device 111 may transmit the user-related data to the terminal management device 113. The terminal device 111 may operate based on control data received from the terminal management device 113. When there is a plurality of terminal devices 111, the plurality of terminal devices 111 may be connected to each other through a network (e.g., a local area network).

The terminal management device 113 (e.g., an IoT device management (IDM) server) may operate as a gateway. The terminal management device 113 may manage the terminal device 111 and control an IoT service. The terminal device 111 and a related IoT service included in the edge network-based device group 11 may be registered to the terminal management device 113. The terminal management device 13 may manage data (e.g., the user-related data, the control data, and service-related data) needed to provide an IoT service to the user. For example, the terminal management device 113 may store the data (e.g., the user-related data, the service-related data, etc.) in the data management device 115 and load the data (e.g., the control data) from the data management device 115.

The data management device 115 (e.g., a first data storage (DS) server) may be connected to the terminal management device 113 or implemented as one device (e.g., a first device) integrated with the terminal management device 113. The data management device 115 may be connected to a data management device included in another edge network-based device group 13 and a data management device 161 included in the cloud-based device group 16 based on distributed ledger technology. The data management device 115 included in the edge network-based device groups 11 and 13 and the data management device 161 included in the cloud-based device group 16 may share data using a blockchain.

The cloud-based device group 16 may include the data management device 161 (e.g., a second DS server), a service management device 163 (e.g., a convergence service management (CSM) server), and a data processing device 165 (e.g., a data processing (DP) server). Each of the data management device 161, the service management device 163, and the data processing device 165 may be implemented as a separate device or as one device (e.g., a second device).

The data management device 161 may be substantially the same as the data management device 115 included in the edge network-based device groups 11 and 13. Thus, a repeated description thereof is omitted.

The service management device 163 may manage data (e.g., the user-related data, the service-related data, and device-related data) for an IoT service. For example, the service management device 163 may load data (e.g., the user-related data and the service-related data) from the data management device 161 and select data for reinforcement learning and/or inference among the data. The service management device 163 may transmit the selected data to the data processing device 165. The service management device 163 may receive control data for the terminal device 111 from the data processing device 165 and store the control data in the data management device 161.

The data processing device 165 may train a neural network using data (e.g., user-related data and service-related data) received from the service management device 163. For example, the data processing device 165 may train a neural network using reinforcement learning. The data processing device 165 may input the data (e.g., the user-related data and the service-related data) received from the service management device 163 to a trained neural network and predict a pattern change of an IoT service to be provided to the user. The data processing device 165 may generate control data related to an IoT service policy of the terminal device 111 based on the predicted pattern change of the IoT service and transmit the control data to the service management device 163.

The data processing device 165 may predict the pattern change of the IoT service to be provided to the user using the data (e.g., the user-related data and the service-related data) shared from the edge network-based device groups 11 and 13 through the blockchain and provide an adaptive service.

Figure 2:
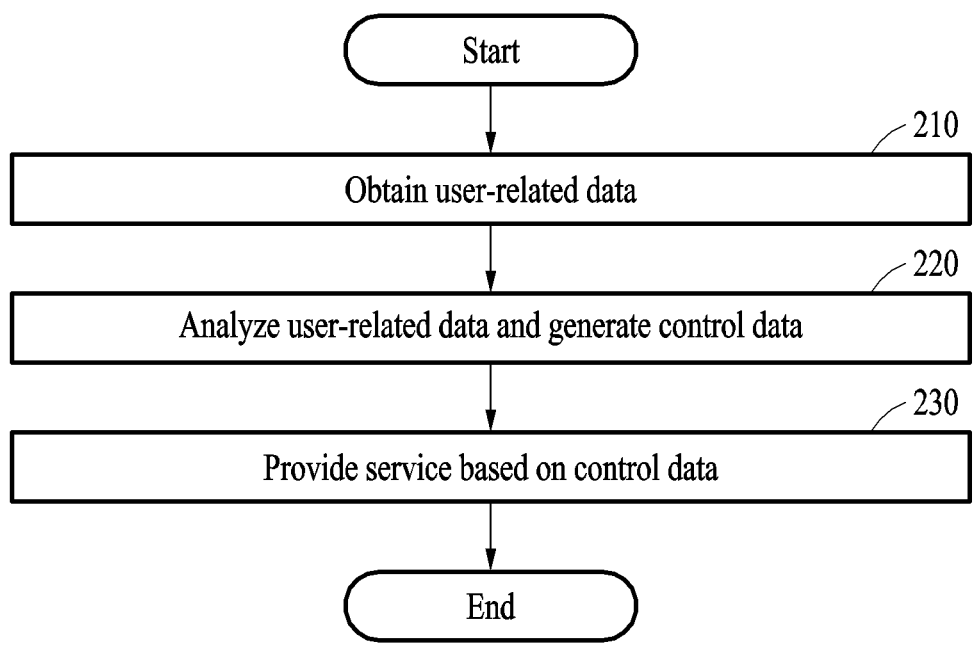
FIG. 2 is a flowchart illustrating operations performed by devices for a framework for an IoT service, according to an embodiment.

FIG. 2 is a flowchart illustrating operations performed by devices for a framework for an IoT service, according to an embodiment.

Referring to FIG. 2, according to an embodiment, operations 210 to 230 may be sequentially performed. However, embodiments are not limited thereto. For example, at least two operations may be performed in parallel.

In operation 210, a first device (e.g., the terminal management device 113 of FIG. 1) may obtain user-related data for an IoT service.

In operation 220, a second device (e.g., the data processing device 165 of FIG. 1) may analyze the user-related data and generate control data.

In operation 230, the first device (e.g., the terminal management device 113 of FIG. 1) may control an IoT device (e.g., the terminal device 111 of FIG. 1) based on the control data.

Figure 3:
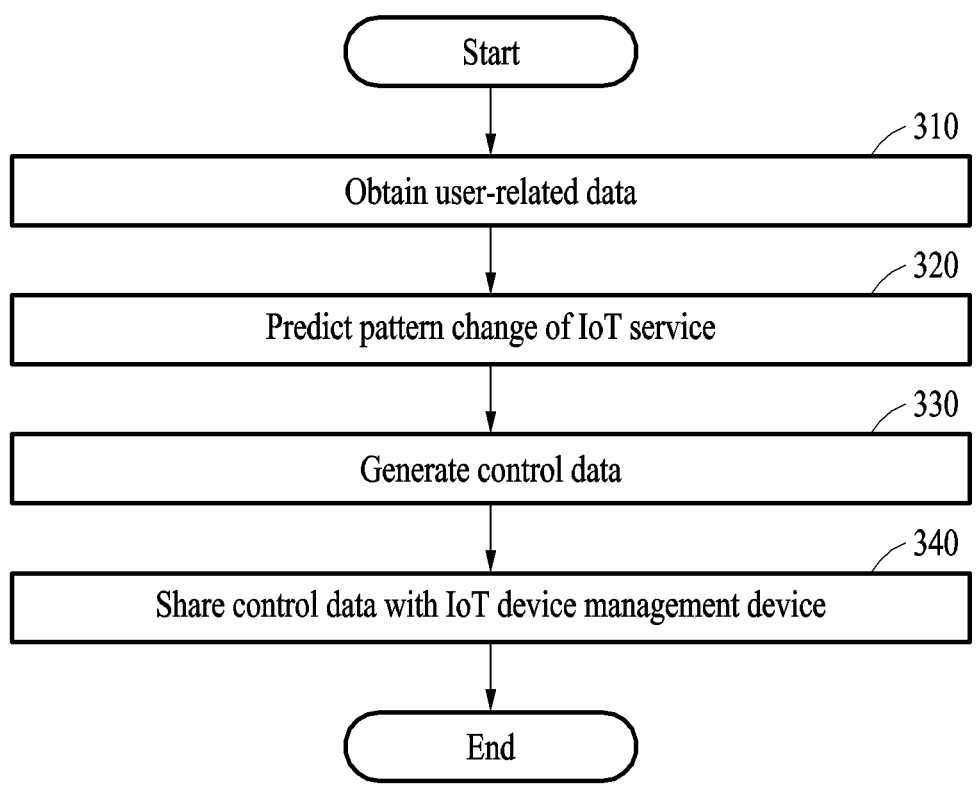
FIG. 3 is a flowchart illustrating operations performed by a data processing device according to an embodiment.

FIG. 3 is a flowchart illustrating operations performed by a data processing device according to an embodiment.

Referring to FIG. 3, according to an embodiment, operations 310 to 340 may be sequentially performed. However, embodiments are not limited thereto. For example, at least two operations may be performed in parallel.

In operation 310, a data processing device (e.g., the data processing device 165 of FIG. 1) may obtain user-related data for an IoT service using a blockchain.

In operation 320, the data processing device 165 may predict a pattern change of the IoT service using the user-related data.

In operation 330, the data processing device 165 may generate control data based on the pattern change of the IoT service.

In operation 340, the data processing device 165 may share the control data with an IDM device (e.g., the terminal management device 113 of FIG. 1) using the blockchain.

Figure 4:
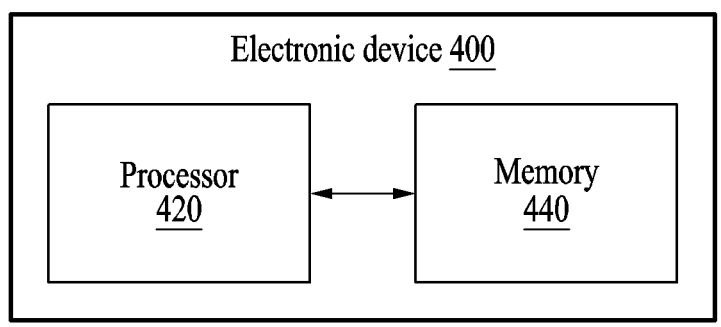
FIG. 4 is a block diagram of an electronic device according to an embodiment.

FIG. 4 is a block diagram of an electronic device according to an embodiment.

Referring to FIG. 4, according to an embodiment, an electronic device 400 (e.g., the data processing device 165 of FIG. 1) may include a memory 440 and a processor 420.

The memory 440 may store instructions (or programs) executable by the processor 420. For example, the instructions may include instructions for performing an operation of the processor 420 and/or an operation of each component of the processor 420.

The memory 440 may include at least one computer-readable storage medium. The memory 440 may include non-volatile storage elements (e.g., a magnetic hard disk, an optical disc, a floppy disc, flash memory, erasable programmable read-only memory (EPROM), and electrically erasable programmable read-only memory (EEPROM).

The memory 440 may be a non-transitory medium. The term "non-transitory" may indicate that the storage medium is not embodied in a carrier wave or a propagated signal. However, the term "non-transitory" should not be interpreted to mean that the memory 440 is non-movable.

The processor 420 may process data stored in the memory 440. The processor 420 may execute computer-readable code (e.g., software) stored in the memory 440 and instructions triggered by the processor 420.

The processor 420 may be a hardware-implemented data processing device with a circuit that has a physical structure to perform desired operations. For example, the desired operations may include code or instructions in a program.

For example, the hardware-implemented data processing device may include a microprocessor, a central processing unit (CPU), a processor core, a multi-core processor, a multiprocessor, an ASIC, and an FPGA.

Operations performed by the processor 420 may be substantially the same as the operations of the data processing device 165 described with reference to FIGS. 1 to 3. Thus, further description thereof is omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components, or a combination thereof. For example, a device, a method, and a component described in the embodiments may be implemented using one or more general-purpose or special purpose computers, such as, for example, a processor, a controller, an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and/or data may be stored in any type of machine, component, physical or virtual equipment, or a computer storage medium or device capable of providing instructions or data to or being interpreted by the processing device. The software may also be distributed over network coupled computer systems so that the software is stored and executed in a distributed fashion. The software and data may be stored in a non-transitory computer-readable recording medium.

The method according to the above-described embodiments may be recorded in non-transitory computer-readable media including program instructions to implement various operations which may be performed by a computer. The media may also include the program instructions, data files, data structures, and the like alone or in combination. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and files containing higher-level code that may be executed by the computer using an interpreter.

The above-described hardware devices may be configured to act as one or more software modules in order to perform the operations of the above-described embodiments, or vice versa.

While this disclosure includes embodiments illustrated with reference to limited drawings, one of ordinary skill in the art may apply various technical modifications and variations based thereon. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A framework for Internet of things (IoT) service, the framework comprising:
   a first device configured to receive user-related data for the IoT service from an IoT device and control an IoT device based on control data that is generated using the user-related data; and
   a second device configured to predict a service pattern change of the IoT service by analyzing the user-related data and generate the control data related to an IoT service policy of the IoT device based on the service pattern change,
   wherein the first device and the second device are configured to share, using a blockchain, the user-related data and the control data,
   wherein the IoT device and the IoT service are registered to the first device,
   wherein the user-related data is obtained from the IoT device and shared with the blockchain, and
   wherein the user-related data includes data related to life pattern of an user of the IoT device.

2. The framework of claim 1, wherein the first device comprises:
   an IoT device management (IDM) server configured to receive the user-related data from the IoT device and control the IoT device; and
   a first data storage (DS) server configured to store the user-related data and the control data and share the user-related data and the control data with the second device through the blockchain.

3. The framework of claim 2, wherein the second device comprises:
   a second DS server configured to share the user-related data and the control data with the first DS server through the blockchain;
   a convergence service management (CSM) server configured to receive the user-related data from the second DS server and manage the user-related data; and
   a data processing (DP) server configured to predict the service pattern change of the IoT service using user-related data that is selected by the CSM server among the user-related data and generate the control data based on the service pattern change of the IoT service.

4. The framework of claim 3, wherein the DP server is configured to predict the service pattern change of the IoT service using a neural network.

5. The framework of claim 4, wherein the neural network is trained based on reinforcement learning.

6. A method of providing an Internet of things (IoT) service, the method comprising:
   obtaining, by a first device, user-related data for the IoT service from an IoT device and controlling, by the first device, an IoT device based on control data that is generated using the user-related data; and
   predicting, by a second device, a service pattern change of the IoT service by analyzing the user-related data and generating, by the second device, the control data related to an IoT service policy of the IoT device based on the service pattern change,
   wherein the first device and the second device are configured to share, using a blockchain, the user-related data and the control data, and
   wherein the IoT device and the IoT service are registered to the first device, and wherein the user-related data is obtained from the IoT device and shared with the blockchain, and wherein the user-related data includes data related to life pattern of an user of the IoT device.

7. The method of claim 6, wherein the first device comprises:

an IoT device management (IDM) server configured to receive the user-related data from the IoT device and control the IoT device; and a first data storage (DS) server configured to store the user-related data and the control data and share the user-related data and the control data with the second device through the blockchain.

8. The method of claim 7, wherein the second device comprises:

a second DS server configured to share the user-related data and the control data with the first DS server through the blockchain;

a convergence service management (CSM) server configured to receive the user-related data from the second DS server and manage the user-related data; and a data processing (DP) server configured to predict the service pattern change of the IoT service using user-related data that is selected by the CSM server among the user-related data and generate the control data based on the service pattern change of the IT service.

9. The method of claim 8, wherein the DP server is configured to predict the service pattern change of the IoT service using a neural network.

10. The method of claim 9, wherein the neural network is trained based on reinforcement learning.

11. A device for an Internet of things (IoT) service, the device comprising:

a memory comprising instructions; and a processor electrically connected to the memory and configured to execute the instructions, wherein, when the instructions are executed by the processor, the processor is configured to control a plurality of operations, the plurality of operations comprising:

obtaining user-related data for the IT service shared on a blockchain;

predicting a service pattern change of the IoT service using the user-related data;

generating control data related to an IoT service policy of the IoT device based on the service pattern change of the IoT service; and sharing, using the blockchain, the control data with an IoT device management device, wherein the control data is for controlling the IoT device, wherein the IoT device and the IoT service are registered to the first device, wherein the user-related data is obtained from the IoT device and shared with the blockchain, and wherein the user-related data includes data related to life pattern of an user of the IoT device.

12. The device of claim 11, wherein the predicting of the pattern change of the IoT service comprises predicting the service pattern change by inputting the user-related data to a neural network.

13. The device of claim 12, wherein the neural network is trained based on reinforcement learning.

14. A non-transitory computer-readable storage medium storing instructions that, when executed by a processor, cause the processor to perform the method of claim 6.

* * * * *